United States Patent [19]

Kaiser

[11] 4,130,380

[45] Dec. 19, 1978

[54] WIND POWERED TURBINE AND AIRFOIL CONSTRUCTION

[76] Inventor: Heinz W. Kaiser, Rte. 1, Box 248, Eugene, Oreg. 97404

[21] Appl. No.: 817,372

[22] Filed: Jul. 20, 1977

Related U.S. Application Data

[63] Continuation-in-part of Ser. No. 686,167, May 13, 1976, abandoned.

[51] Int. Cl.² ............................................. F03D 3/06
[52] U.S. Cl. ............................ 416/197 A; 416/132 B; 416/227 A
[58] Field of Search ........... 416/132 R, 132 B, 197 A, 416/227, 119, 240 A, DIG. 4, DIG. 6

[56] References Cited

U.S. PATENT DOCUMENTS

| 2,872,987 | 2/1959 | Gahagan | 416/225 X |
|---|---|---|---|
| 3,150,850 | 9/1964 | Barish | 416/132 B X |
| 3,400,904 | 9/1968 | Bede | 416/132 X |
| 3,597,108 | 8/1971 | Mercer et al. | 416/132 B X |
| 3,637,168 | 1/1972 | Ryan et al. | 416/132 |
| 3,647,317 | 3/1972 | Furlong et al. | 416/226 |
| 3,918,839 | 11/1975 | Blackwell et al. | 416/197 A X |
| 4,050,246 | 9/1977 | Bourquardez | 416/132 B X |

FOREIGN PATENT DOCUMENTS

| 860930 | 12/1952 | Fed. Rep. of Germany | 416/119 |
|---|---|---|---|
| 1960262 | 6/1971 | Fed. Rep. of Germany | 416/132 |
| 929721 | 1/1948 | France | 416/119 |
| 2298707 | 8/1976 | France | 416/227 A |
| 2303967 | 10/1976 | France | 416/132 B |
| 295965 | 5/1932 | Italy | 416/197 A |

*Primary Examiner*—Everette A. Powell, Jr.
*Attorney, Agent, or Firm*—James D. Givnan, Jr.

[57] ABSTRACT

Airfoil blade construction utilizing a spar assembly consisting of a primary and secondary spar interconnected by a web. A tower supports a rotor structure with outwardly curved airfoil blades carried at the outer ends of rotor arm members. Aerodynamic blade sections are formed with irregular, transversely extending openings to permit sliding disposition onto the blade spar assembly. The aerodynamic sections are joined by a suitable bonding agent. A suitable exterior is applied to the joined aerodynamic sections to reinforce the airfoil construction as well as to protect same from the elements. Fittings on the spar assembly enable attachment of the airfoil to a supporting structure.

6 Claims, 10 Drawing Figures

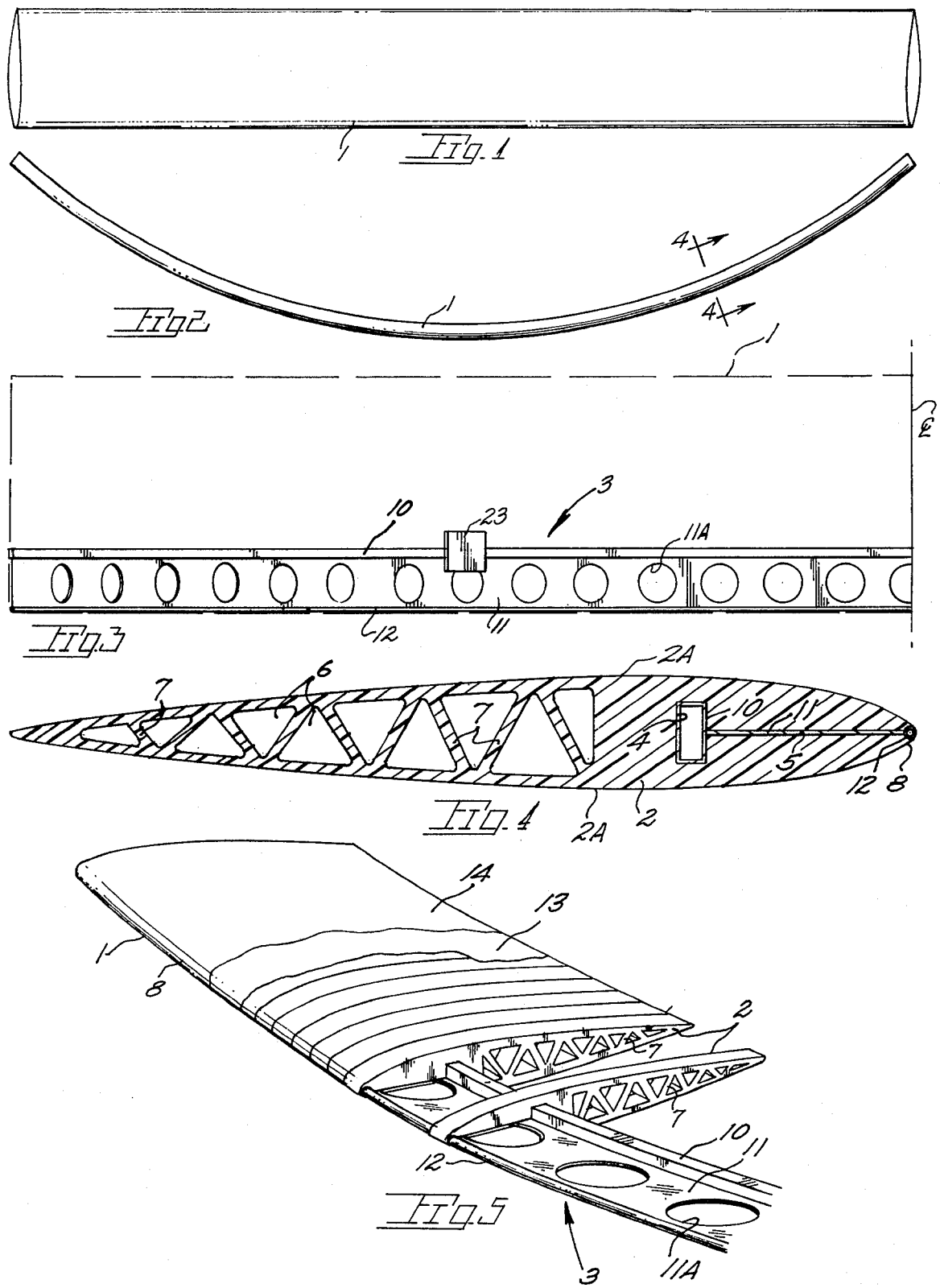

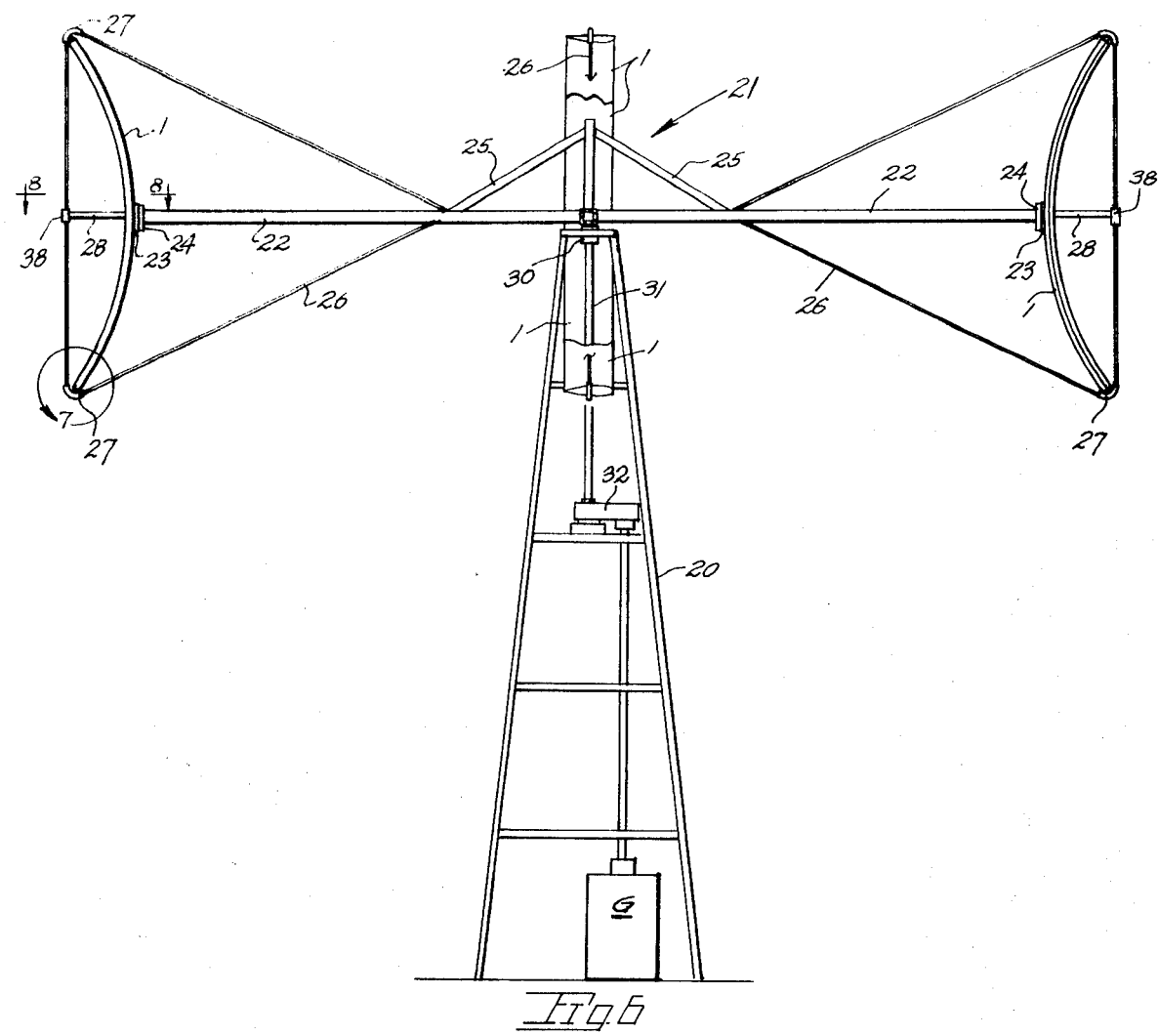
Fig. 6
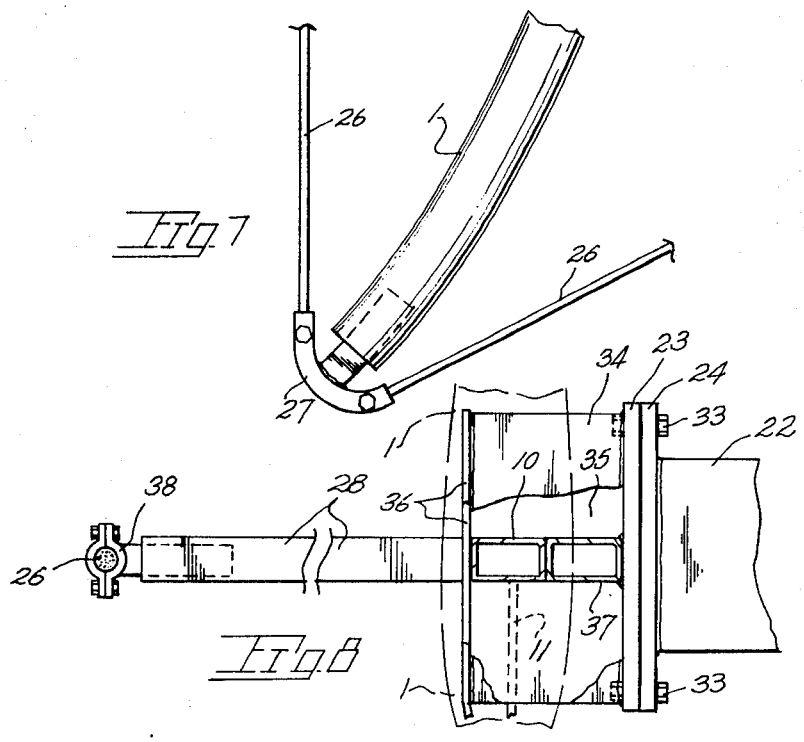
Fig. 7
Fig. 8

4,130,380

WIND POWERED TURBINE AND AIRFOIL CONSTRUCTION

BACKGROUND OF THE INVENTION

The present application is a continuation-in-part of my copending U.S. patent application bearing the same title filed May 13, 1976 under Ser. No. 686,167, now abandoned.

The present invention relates to wind powered turbine blade construction utilizing both metal and foamed components and to turbines or windmills having an axis of rotation perpendicular to the wind direction.

Known within the prior art is wing construction wherein a substantial portion of the wing is formed from cellular foamed material. One such prior art wing construction is found in U.S. Pat. No. 2,400,649. For the most part, the airfoil construction within the prior art envisions a foamed mass, the shape of same being determined by a costly mold which is limited to a specific wing configuration. In some instances, the wing core is formed by depositing the foamed material in a fluid state about a wing spar. Additional examples of airfoil construction using foamed materials are found in the following U.S. Pat. Nos. 3,176,775, 3,396,922, 3,396,923, 3,416,756 and 3,647,317. Also of interest, with regard to wind powered turbines, are U.S. Pat. Nos. 1,835,018 and 3,918,839, which disclose blades moving about an axis perpendicular to the wind direction.

SUMMARY OF THE PRESENT INVENTION

The present invention is embodied within a wind powered turbine and within an airfoil blade for use in conjunction therewith. The present airfoil blade may be termed as being of stacked construction in that a multitude of foamed aerodynamic sections are assembled in abutting relationship along a common spar assembly.

Spar construction includes main and secondary spar components interconnected by a common web member. Molded aerodynamic sections each define a transverse opening for the internal reception of the spar assembly. Each of the aerodynamic sections is suitably joined with adjacent abutting sections. Both the spar assembly and aerodynamic sections may be of open construction for purposes of weight reduction. Additionally, the aerodynamic sections receive a weather protective covering provided to the completed airfoil exterior.

Important objectives of the present invention include: the provision of an airfoil blade of relatively lightweight uncomplicated construction particularly useful as the blade of a wind turbine; the provision of airfoil blade construction wherein airfoil sections and a spar assembly are of strong, yet lightweight, construction permitting blades of considerable length to be conveniently transported to and erected at remote sites suitable for wind turbines; the provision of wing construction lending itself to low cost production methods; the provision of an airfoil blade resistant to distortion from dynamic loads; the provision of a lightweight airfoil blade particularly suited to withstand centrifugal forces; the provision of a wind turbine having a rotor structure including arms having curved blades at their outer ends with the end segments of each blade directed outwardly away from the axis of blade rotation and which is conjunction with tensioned means resist blade distortion under dynamic loads as well as wind loads; the provision of a wind turbine of compact, efficient design having a swept area equivalent to the swept area of much larger turbines employing known turbine design; the provision of a wind turbine having a relatively large wind swept area in relation to tower height by reason of multi-bladed rotor structures lending themselves to stacking in a compact manner within a tower structure.

BRIEF DESCRIPTION OF THE DRAWING

In the accompanying drawing:

FIG. 1 is a plan view of the airfoil made in accordance with the present invention;

FIG. 2 is a front elevational view of the airfoil shown in FIG. 1;

FIG. 3 is a plan view of one-half of the airfoil with a spar assembly shown in full and the airfoil perimeter shown in broken lines;

FIG. 4 is a sectional view taken along line 4—4 of FIG. 2;

FIG. 5 is a perspective view of the airfoil partially constructed;

FIG. 6 is an elevational view of a wind turbine within which is embodied the present invention;

FIG. 7 is an enlarged detail view of the structure encircled at 7 in FIG. 6;

FIG. 8 is a horizontal view taken downwardly approximately along line 8—8 of FIG. 6;

DETAILED DESCRIPTION OF THE PREFERRED EMBODIMENT

Figure 9:
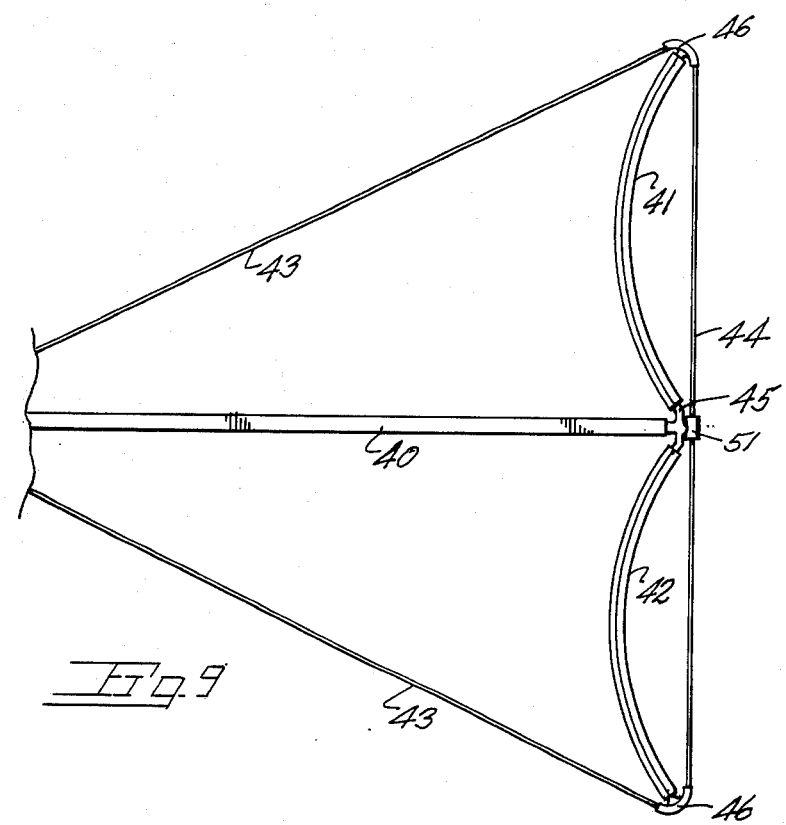
FIG. 9 is a fragmentary side elevational view of a modified rotor structure wherein each arm carries multiple airfoil blades.

With continuing reference to the accompanying drawing wherein applied reference numerals indicate parts similarly identified in the following specification, the reference numeral 1 identifies an airfoil blade which is presently configured for use in conjunction with a wind turbine but which may otherwise be utilized without departing from the intended scope of the invention.

The airfoil blade comprises a multitude of aerodynamic sections 2 in joined, juxtaposed relationship along a spar assembly indicated generally at 3 in FIG. 3. With individual attention to aerodynamic sections 2 best shown in FIG. 4, the same are of foamed construction and may be formed from various cellular materials, one such material suitable to the present purposes being high density, closed cell polystyrene. The molded aerodynamic sections are formed with and inwardly located, transversely extending open area at 4 in communication with a slot-like opening 5 extending forwardly toward the airfoil's leading edge surface 8. Indicated at 6 are a series of triangular openings for weight reducing purposes defined by integral truss portions 7. The sections thus described are of an extremely lightweight, rigid nature. In one embodiment, the aerodynamic sections have a width of approximately two inches, a cord length of approximately thirty inches and a maximum depth of approximately three and one-half inches between outer surfaces 2A.

With attention now to the spar assembly indicated at 3, the same includes a primary tubular member 10 extending the length of the airfoil and which may be provided with fittings as later elaborated upon for the purpose of incorporating the airfoil into a supporting structure. Projecting forwardly from tubular spar 10 is a web 11 along the forward or leading edge of which is mounted a secondary spar 12 which also is of a tubular nature but of lesser section than said primary spar. Spar components may be lightened as by the spaced apart openings at 11A in the web without severely diminishing spar strength. The spar assembly is of welded construction of metals used in aircraft construction and of a configuration to suit the purposes at hand. As shown in FIG. 2, the spar assembly is formed on a curve for present purposes but may be straight or otherwise curved to suit airfoil purposes.

The construction of each aerodynamic section is such as to permit mounting of the sections on the spar assembly by lengthwise sliding movement, thus permitting the stacked sections to provide an airfoil of any desired length. Heretofore, to the extent known, wing core construction utilizing expanded meterials necessitated the construction of costly molds capable of producing but one airfoil configuration.

For assembling the abutting aerodynamic sections each section is provided with a bonding agent along its opposite sides or mating surfaces as well as communicating openings 4 and 5. The bonding agent may be any of the synthetic resins compatible with the foamed material used. In assembly of the sections along the spar assembly, the sections may be alternately inverted to benefit from the integral, asymmetrical truss-like construction of each section.

Each fabricated airfoil blade is provided with a protective covering which may take various forms. One such covering is a reinforced tape wrapping wound fore and aft about the length of the joined aerodynamic sections which tape imparts increased strength to the joined sections as well as protecting same from the elements. Additional tape may be applied over the reinforced tape with the exterior tape being of the adhesive, metallic type.

An alternative covering may be with a gel coat of the type commonly applied to glass reinforced plastic structures. A still other protective measure may be that of simply coating the exterior foamed surfaces so as to provide a smooth, uninterrupted surface not susceptible to weathering.

In construction of the present airfoil, the spar assembly components 10, 11 and 12 are formed to the configuration desired which may be slightly curved, as shown, when the airfoil is to used in conjunction with a wind turbine per FIG. 6.

In fabrication, the aerodynamic sections are slid lengthwise into place along the spar assembly into abutment with a previously applied aerodynamic section. Preferably, each aerodynamic section is formed within a two-part mold within which expandable bead material is placed and thereafter heated with said material completely filling the mold voids. One set of molds is adequate for the production of all aerodynamic sections for the presently described airfoil.

In FIG. 6 I show a wind powered turbine within which the present airfoil blade is utilized. In the wind turbine shown, a tower structure 20 supports a rotor structure generally at 21 including curvilinear airfoil blades with outwardly directed end segments. Each airfoil blade is carried in an upright manner at the end of a rotor arm 22 as by bolted plates 23 and 24. Diagonal arm braces at 25 may be of box beam construction to receive elongate tensioned means 26 secured to airfoil blade end segments by means of curved tubular fittings 27 and dead-ended back to the rotor structure. A strut at 28 on each airfoil constitutes an arm member extension and is coupled to an additional length of tensioned means 26. The rotor assembly is suitably journalled at 30 within the tower and drives an output shaft 31 which may drive a generator G via a gear drive 32.

With attention to FIG. 8, an interface is shown between the end of rotor arm 22 and an airfoil blade 1. The rotor arm is of tubular configuration fitted, as aforesaid, with a connector plate 24 to which is secured a companion connector plate 23 with suitable fasteners being indicated at 33. A weldment on plate 23 includes a pair of upper and lower plates 34 and 35, each of which supports along their outer edges elongate restraining plates at 36 which abut primary spar 10. Primary spar 10 is in opposite abutment with a spacer tube segment 37 which, in turn, abuts plate 23. Projecting outwardly from primary spar 10 is aforementioned strut or arm member extension 28 which receives within its outer end a clamp fitting 38 which engages the additional length of tensioned means 26. The latter may be cable.

With attention to FIG. 9, the rotor structure shown therein includes radially extending arms as at 40 supporting multiple airfoil blades 41-42. Elongate tensioned means are indicated at 43 with additional tensioned means indicated at 44, all being similar to the earlier described rotor structure. A fitting 45 at the end of arm 40 interconnects the adjacent ends of the upper and lower airfoil blades 41-42 with the arm end and also provides an attachment point or clamp 51 for means 44. Additional fittings at 46 serve to interconnect the tensioned means with the remaining ends of the airfoil blades again to support the latter against operational forces as earlier noted in connection with the first described rotor structure.

Figure 10:
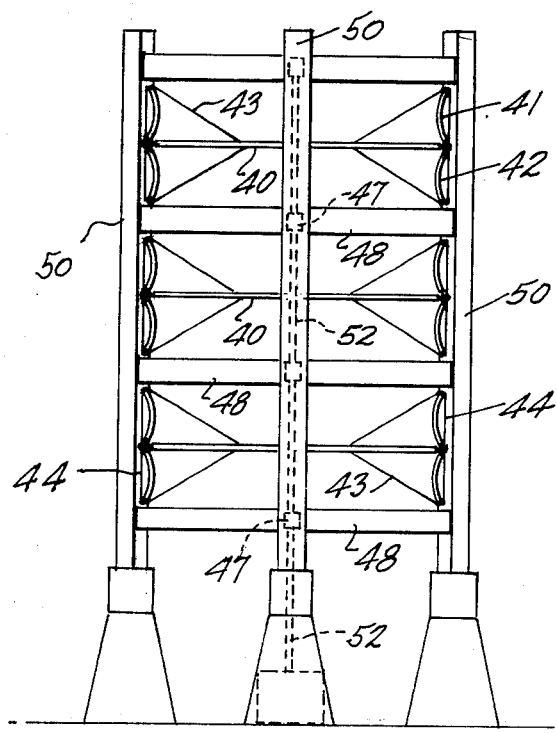
FIG. 10 is a side elevational view of a tower supporting vertically spaced, multiple rotor structures.

With attention to FIG. 10, multiple rotor structures of the last described type are shown disposed in vertically spaced or stacked relationship to one another in a tower structure 50. Each rotor structure is carried by a centrally disposed, common shaft 52 journalled in bearings 47 which, in turn, are supported by radially extending tower members 48. This arrangealso provides a large swept area relative to tower height. For the purposes of avoiding turbulence each rotor arm would be horizontally offset sixty degrees from adjacent upper and lower arms of the remaining rotor structures, which offset is not shown in the drawing.

The curvilinear airfoil blade in combination with the tensioned elongate means is particularly capable of withstanding dynamic loads. The outwardly directed blade end segments are restrained aginst outward displacement by tensioned means 26 with a reaction force exerted through the airfoil blade subjecting same to non-critical compression forces. A further advantage of the present blade configuration is the avoidance of drag, or at best low torque values, by dispensing with inner blade segments in tower proximity as used in prior art turbines. An additional advantage derived by the present blade configuration is the better utilization of tower height with greatly increased swept area of torque producing surfaces of the present turbine over that of known turbine designs of like tower height. Further, the present blade configuration avoids imparting compression forces to the tower as occur with a blade of troposkein shape which deforms outwardly at its midportion under severe tension loads which result in opposite vertical loads being applied to the blade end segments and ultimately to the blade supporting member. The present blade construction advantageously permits the use of a shorter blade structure and hence one of greater rigidity to avoid both severe bending loads and better withstand torsional loads resulting from a generator load on the turbine output shaft. Multi-bladed rotor structures may be supported by a single supporting member by reason of same being subjected to only rotor structure weight and not opposed compression loads as occur in known turbine designs.

While I have shown but one embodiment the invention, it will be apparent to thos skilled in the art that the invention may be embodied still otherwise without departing from the spirit and scope of the invention.

Having thus described the invention, what is desired to be secured under a Letters Patent is:

1. Airfoil blade construction comprising in combination, a spar assembly curved in a lengthwise direction, a plate structure secured to said spar assembly at a point intermediate its ends for purposes of attachment of the airfoil blade to a supporting structure, aerodynamic sections each defining a transversely extending opening spaced inwardly from the exterior surfaces of the section, said opening of a sectional configuration corresponding to a spar assembly section permitting the mounting of the aerodynamic section on said spar assembly by lengthwise movement along the latter into abutment with a previously mounted section, each aerodynamic section being of non-metallic open construction for a portion of its length and thereat having integral truss components, said truss components being asymmetrical to the symmetrical outer surfaces of the section whereby the alternate inverting of aerodynamic sections when installed in place on the spar assembly will enhance airfoil blade strength.

2. A wind powered turbine comprising in combination,
   a tower, and
   a rotor structure supported by said tower including outwardly extending arms, an airfoil blade supported in an upright manner at the outer end of each of said arms, each blade being of curvilinear shape with blade end segments directed outwardly away from the axis of rotor rotation, each blade being of an aerodynamic shape and having a leading edge, tensioned elongate means extending intermediate each blade end segment and its supporting arm to receive blade imparted loads to inhibit blade distortion under dynamic loads.

3. The wind powered turbine claimed in claim 2 wherein additional elongate means interconnect the outwardly directed blade end segments of each blade.

4. The wind powered turbine claimed in claim 3 additionally including an extension on each of said arms, said additional elongate means having an attachment point on said arm extension.

5. The wind powered turbine claimed in claim 2 wherein said airfoil blade additionally includes a spar assembly including primary and secondary spars and a web therebetween all being curved in a lengthwise direction, a plate structure secured to said spar assembly at a point intermediate its ends for purposes of attachment of the airfoil blade to a supporting structure, and aerodynamic sections each defining a transversely extending opening spaced inwardly from the exterior surfaces of the section, said opening of a sectional configuration corresponding to a spar assembly section permitting the mounting of the aerodynamic section on said spar assembly by lengthwise movement along the latter into abutment with a previously mounted section, each aerodynamic section being of non-metallic open construction for a portion of its length and thereat having integral truss components, said truss components being asymmetrical to the symmetrical outer surfaces of the section whereby the alternate inverting of aerodynamic sections when installed in place on the spar assembly enhances airfoil blade strength.

6. The wind powered turbine claimed in claim 2 wherein each arm of the rotor structure supports multiple airfoil blades.

* * * * *